United States Patent
Borges et al.

(10) Patent No.: US 10,673,984 B1
(45) Date of Patent: Jun. 2, 2020

(54) DIRECTLY MODIFYING FAILED QUEUED REQUESTS FOR AN OFFLINE APPLICATION USING THE BACKEND TYPE SYSTEM

(71) Applicant: SAP SE, Walldorf (DE)

(72) Inventors: Matthew Borges, Kitchener (CA); David Brandow, Guelph (CA); Martin Lacasse, Montreal-Ouest (CA); Yunjiao Xue, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/210,613

(22) Filed: Dec. 5, 2018

(51) Int. Cl.
| | |
|---|---|
| *H04L 29/08* | (2006.01) |
| *G06F 9/451* | (2018.01) |
| *G06F 16/23* | (2019.01) |
| *G06F 9/54* | (2006.01) |
| *H04L 29/06* | (2006.01) |

(52) U.S. Cl.
CPC ............ *H04L 67/32* (2013.01); *G06F 9/451* (2018.02); *G06F 9/546* (2013.01); *G06F 16/23* (2019.01); *H04L 67/2833* (2013.01); *H04L 67/34* (2013.01); *G06F 2209/548* (2013.01); *H04L 67/10* (2013.01); *H04L 67/42* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,734,591 B1 * | 6/2010 | Mercier | ............ | G06F 11/1466 707/639 |
| 9,509,769 B2 * | 11/2016 | Hurst | .............. | H04L 67/1095 |
| 2003/0077097 A1 * | 4/2003 | Parry | .................. | G06F 3/121 400/74 |
| 2012/0239739 A1 * | 9/2012 | Manglik | ............. | G06F 9/5077 709/203 |
| 2014/0172783 A1 * | 6/2014 | Suzuki | .................... | G06F 8/63 707/609 |
| 2015/0149870 A1 * | 5/2015 | Kozat | .................. | H04L 1/0048 714/772 |
| 2015/0244878 A1 * | 8/2015 | MacAuley | ............ | G06Q 50/01 358/1.2 |

* cited by examiner

*Primary Examiner* — El Hadji M Sall
(74) *Attorney, Agent, or Firm* — Sterne, Kessler, Goldstein & Fox P.L.L.C.

(57) ABSTRACT

Disclosed herein are system, method, and computer program product embodiments for allowing a client application to modify failed update requests in an request queue accessible by a mobile device. As a cloud platform may provide offline data services to client applications, a device may need to synchronize a locally stored or otherwise accessible offline store with the cloud platform when connectivity returns. The client application may place failed requests into a request queue, store information about the failed requests in an error archive, and subsequently allow users to directly modify the requests in the request queue for resubmission to the cloud platform. The client application may provide an interface to users to fix the failed requests that is familiar and to the standard interface in the client application.

20 Claims, 4 Drawing Sheets

DIRECTLY MODIFYING FAILED QUEUED REQUESTS FOR AN OFFLINE APPLICATION USING THE BACKEND TYPE SYSTEM

BACKGROUND

A cloud platform may provide an offline service that allows a client application running on a mobile device to function when the mobile device is offline. While offline, a client application may process any reads, writes, inserts, and other operations via an offline store housed on the mobile device and record the operations in a request queue. When connectivity between the mobile device and the cloud platform is restored, the client application and cloud platform may process modifications that occurred while the device was offline to synchronize the offline store and a backend. When processing the request queue, errors may occur, resulting in data inconsistencies.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
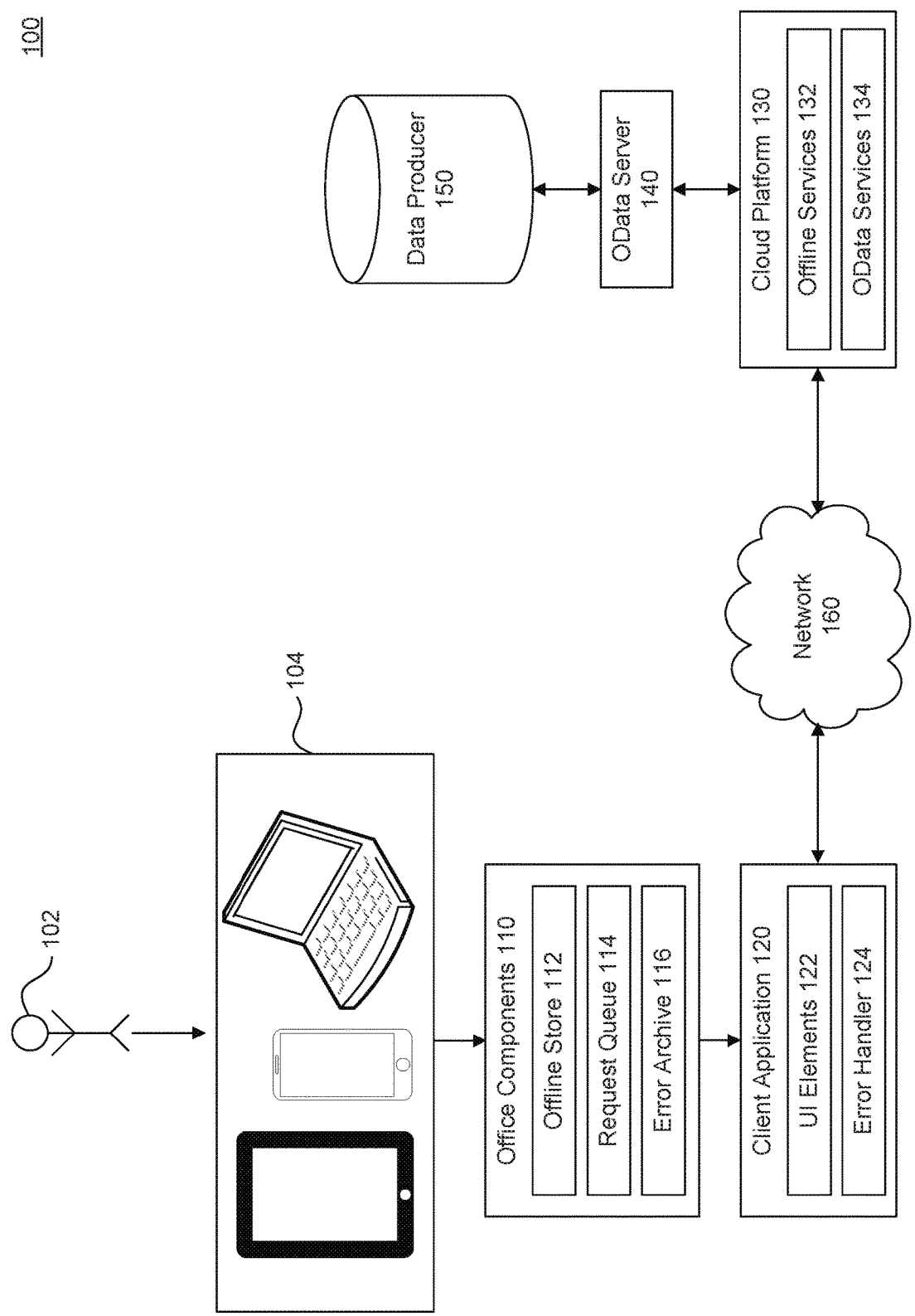
FIG. 1 is a schematic block diagram showing an example system including a client application and a cloud platform, according to some embodiments.

Provided herein are system, apparatus, device, method and/or computer program product embodiments, and/or combinations and sub-combinations thereof, for allowing a client application to modify failed update requests in an request queue accessible by a mobile device.

A cloud platform may provide tools that allow organizations and individuals to build, deploy, and maintain software applications. A cloud platform may advance a software-as-a-service model, providing organizations with hardware components, e.g., application servers, databases, routers, load balancers, etc., and management services, e.g., hosting, data storage, analytics, machine learning, etc. By managing the infrastructure and providing configuration tools, a cloud platform may allow organizations to rapidly build and deploy customized applications. A cloud platform may interact with a backend or data producer that houses application-relevant data. The cloud platform may provide access to the backend data through a suitable driver, application programming interface, querying mechanism, and/or other suitable protocol, for example, OData.

A user may employ a client application on a device to connect to the cloud platform. In one example, a user may view, organize, manipulate, explore, and/or otherwise interact with data in the cloud platform via the client application. The client application may house an offline store of the data on the client device. The offline store may be a local copy of data retrieved from a data producer via the cloud platform. The offline store may remain available (to the device and a client application running thereon) when the device cannot communicate with the cloud platform. Thus, full operation of the client application may continue on the device even though the device is no longer connected to the data producer. Keeping an offline store on a mobile device may also improve the performance of client applications by reducing interactions with the cloud platform. The client application may process any reads, writes, inserts, and other operations using the offline store and record the operations in a request queue.

When the device reestablishes connectivity with the cloud platform, the client application may transmit to the cloud platform any modifications that occurred, as reflected in the request queue, to synchronize the offline store and the backend. However, one skilled in the relevant art(s) will appreciate that while applying the modifications to the backend, errors may occur. For example, changed circumstances in the backend data may result in duplicative insertions, thus violating a unique constraint, reference constraint, or primary key. For another example, an update may violate business logic or transactional restraints that are otherwise not known to the client application, for example trying to insert a future date in a record field. When such errors occur, the client application may log the errors to a table or other suitable data structure on the client device, referred to herein as the error archive.

A client application may employ a merge algorithm provided within a software development kit on a device to programmatically remedy errors in the error archive prior to resending the requests. Such a merge algorithm may automatically adjust the requests in the request queue based on the operations and entities invoked by the requests. After the requests are merged, the modified requests may be re-run, thus bringing the offline store and the backend back into synchronization.

However, a merge algorithm may not be able to process non-mergeable operations. Operations may be non-mergeable when merging the operation in the request queue would violate application business logic or where the implicated operation and/or entities are part of a transaction. A client application may specify that certain operations are non-mergeable for a variety of other reasons to match the application's unique requirements. Thus, the merge algorithm approach may not function for all use cases.

Accordingly, a need exists to allow a client application to directly modify failed requests in the request queue in a seamless and familiar fashion.

FIG. 1 illustrates a schematic block diagram showing an example system 100, according to some embodiments. System 100 may include user 102, device 104, offline components 110, client application 120, user interface elements 122, error handler 124, cloud platform 130, offline services 132, OData services 134, OData server 140, data producer 150, and network 160.

User 102 may be an individual or entity using data-driven software applications. User 102 may be a member of a business, organization, or other suitable group using software designed to perform organizational tasks. User 102 may be an individual using software applications for personal pursuits. User 102 may be a human being, but user 102 may also be an artificial intelligence construct. User 102 may employ, i.e., connect to, a network or combination of networks including the Internet, a local area network (LAN), a wide area network (WAN), a wireless network, a cellular network, or various other types of networks as would be appreciated by a person of ordinary skill in the art.

Device 104 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Although device 104 is illustrated in the example of FIG. 1 as a single computer, one skilled in the art(s) will understand that device 104 may represent two or more computers in communication with one another. Therefore, it will also be appreciated that any two or more components of system 100 may similarly be executed using some or all of the two or more computers in communication with one another.

Offline components 110 may allow applications on device 104 to continue to function when device 104 is offline. Offline components 110 may include offline store 112, request queue 114, and error archive 116.

Offline store 112 may store data used by device 104 and applications running thereon. In an embodiment, offline store 112 may be stored locally on device 104 or otherwise locally cached, but in an alternate embodiment, offline store 104 may be stored off-device and accessed by device 104 through a suitable method. Offline store 112 may be a relational database, a NoSQL database or other horizontally scaling database, or any other database adhering to a suitable database design methodology. Offline store 112 may employ tables to store data and may use a row-based or columnar organizational methodology or design. Offline store 112 may be a flat file, text file, spreadsheet, or other data storage mechanism providing the ability to read and manipulate data. Offline store 112 may be initialized by retrieving a copy of backend data from a data producer and storing the data on device 104.

Request queue 114 may store logs or records of any reads, writes, inserts, and other operations conducted by an application when device 104 is offline. Request queue 114 may store the requests as entries in database tables, transaction logs, or other suitable storage mechanism. When device 104 returns online, the records in request queue 114 may be processed. In one embodiment, request queue 114 may be processed by running a merge algorithm against the requests when the requests are mergeable.

Error archive 116 may store a request and relevant details about the request when a request fails during synchronization. Error archive 116 may also store entities and operations involved in the request, a description of any errors, and other suitable information.

Client application 120 may be a data driven and/or data consuming software application. Client application 120 may meet diverse requirements and provide numerous functionalities. In one embodiment, client application 120 may run on and/or be installed upon device 104, but client application 120 may be de-coupled from device 104 in alternate embodiments. Client application 120 may be a mobile application or other executable software program deployed to device 104. In another embodiment, client application 120 may be housed on a remote server and delivered over a network to user 102. More than one client application 120 may reside on the same remote server. User 102 may interact with client application 120 through a web browser or interface such as Chrome, Firefox, etc. on device 104. User 102 may also interact with client application 120 through a mobile application, desktop application, or other suitable software interface. Client application 120 may serve a particular function, purpose, or goal, but not necessarily. Client application 120 may incorporate dynamic interactions with user 102 through user input and data processing, but client application 120 may merely relay information without receiving inputs from user 102. The breadth of functionality provided by client application 120 will be appreciated by one skilled in the relevant art(s) to be vast and expansive.

User interface elements 122 may provide components to render a user interface for view by user 102 on device 104. User interface elements 122 may include a JavaScript library or other user interface library to facilitate dynamic interactions between user 102 and application 120. User interface elements 122 may include a development toolkit facilitating the building and deployment of HTML5 applications or mobile applications. User interface elements 122 may include appropriate stylesheets and design formats to shape, for example, the display format of data retrieved from cloud platform 130.

Error handler 124 may facilitate error resolution of errors that occur in a synchronization between offline store 112 and the backend. Error handler 124 allow user 102 to examine errors in error archive 126 following such a synchronization. For example, error handler 124 may retrieve one or more requests from request queue 114 based on an error in error archive 116 and present an appropriate screen or interface to user 102 to allow user 102 to edit the request in request queue 114. Error handler 124 may present the interface using a familiar interface, i.e. a screen that appears to impact the original entity and operations that resulted in the request error. Thus, user 102 may not even be aware that they are editing a request in the error archive as opposed to an entity in offline store 112 and/or the backend data.

Cloud platform 130 may provide tools to allow software applications to be built, deployed, and maintained. For example, cloud platform 130 may facilitate the creation of customer relationship management tools, enterprise resource planning tools, commerce applications, word processing applications, communication applications, product lifecycle management tools, supply chain management, general business solutions, and many other types of applications. Cloud platform 130 may include a user interface, device, application, or other system that collects, manipulates, stores, and/or archives data. Cloud platform 130 may provide stored data to client applications 120 through a suitable interface, application programming interface, querying mechanism, and/or other suitable protocol, for example, OData.

Cloud platform 130 may employ a suitable application server, web server, or other mechanism for responding to web traffic received over appropriate communication channels. Cloud platform 130 may allow application developers to deploy applications written in the advanced business application programming language or other suitable high-level programming language, e.g., C/C++, Java, Perl, etc. Cloud platform 130 may divide business applications into a presentation layer (e.g., ASP, JSP, BSP, etc.), business-logic layer (e.g., J2EE runtime environment, java beans, etc.), integration layer (connecting to other application servers or APIs), connectivity layer (e.g., HTTP, HTTPS, SSL, etc.), persistence layer (e.g., SQL, etc.), and other suitable layers. Cloud platform 130 may provide a mechanism to authenticate incoming web traffic, interact with backend systems to formulate appropriate responses, and return these responses to client application 120. Cloud platform 130 may include offline services 132 and OData services 134. In an alternate embodiment, OData services 134 may be provided outside of cloud platform 130.

Offline services 132 may interact with client application 120 in an myriad of ways to facilitate a functioning offline mode of client application 120 on device 104. Offline services 132 may serve as an intermediary between client application 120 and backend data. Offline services 132 may coordinate synchronizations between offline store 112 and backend data, passing error messages that occur when synchronizing to client application 120 for storage in error archive 116.

OData services 134 may be a REST-based protocol for querying and updating data. OData services 134 may be built on standardized technologies such as HTTP, Atom/XML, and JSON. OData services 134 may provide various functions and standardized data models. For example, OData services 134 may support CRUD (Create, Read, Update, Delete) operations for creating and consuming data. In an alternate embodiment, OData services 134 may leverage ODBC, JDBC, .NET, or other suitable access methodology.

OData server 140 may be a server, virtual machine, computer, or other system exposing data via a REST-based protocol. OData server 140 may be housed in cloud platform 130 or a third-party implementation outside of cloud platform 130. In an alternate embodiment, OData server 140 may be accomplished using OData integration services, e.g., OData services 134, provided by cloud platform 130.

Data producer 150 may create, store, and maintain data. Data producer 150 may be connected to by OData server 140 to retrieve data. This data may be used by client application 120 and other software applications in multitudinous ways. Data producer 150 may be housed in cloud platform 130 or be appropriate third-party data used by client application 120. Data producer 150 may be a relational database, a NoSQL database or other horizontally scaling database, or any other database adhering to a suitable database design methodology. Data producer 150 may harness any commercially available database management system to store data retrievable by client application 120 or implemented in a custom database management system. In an embodiment, data producer 150 implements a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, data producing application deploys a hard-disk interface, such as ATA, SATA, SCSI, SAS, and/or fibre for interfacing with storage mediums. Data producer 150 may employ tables to store data and may use a row-based or columnar organizational methodology or design. Data producer 150 may be an in-memory database or a database management systems that employs a disk storage mechanism.

Network 160 may be any network or combination of networks including the Internet, a local area network (LAN), a wide area network (WAN), a wireless network, a cellular network, or various other types of networks as would be appreciated by a person of ordinary skill in the art.

Figure 2:
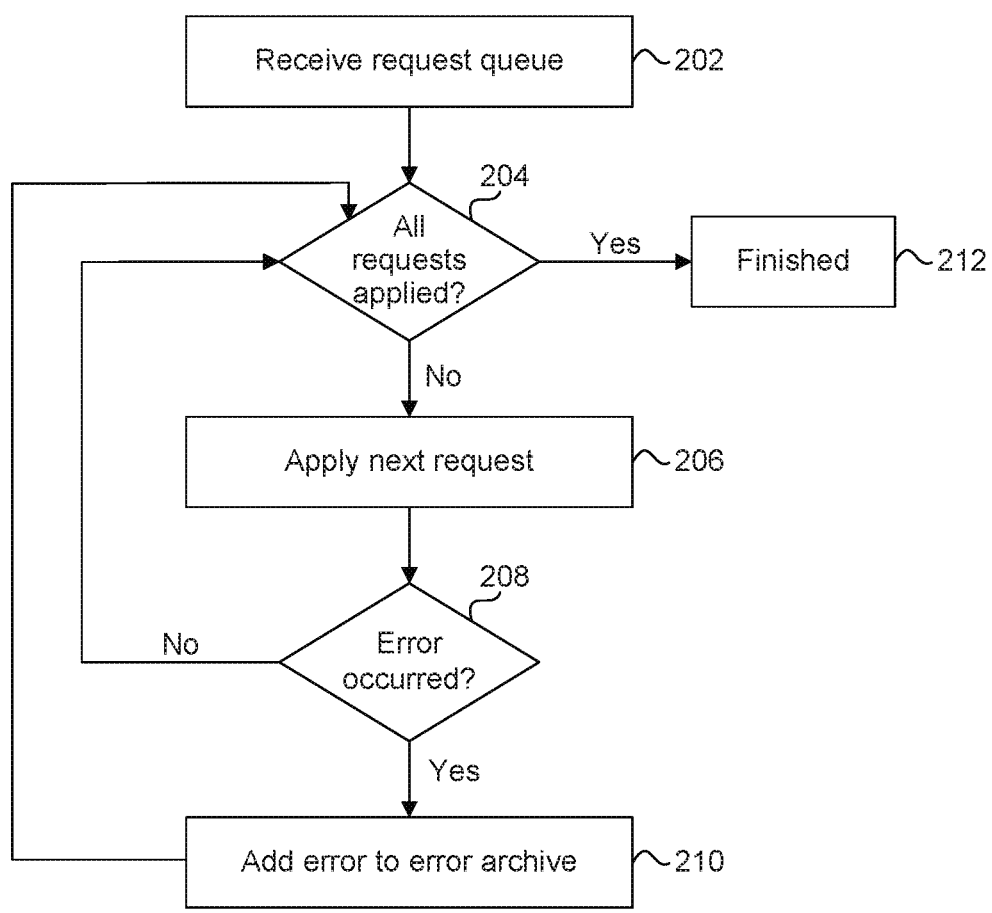
FIG. 2 is a flowchart illustrating a method of logging errors to an error archive that occur while processing a request queue, according to some embodiments.

FIG. 2 illustrates a method 200 of logging errors to an error archive that occur while processing a request queue, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art(s).

In 202, cloud platform 130 may receive a request queue, such as request queue 114, that includes modifications made to offline store 112 by client application 120 when device 104 was offline. User 102 may make one or more updates to offline store 112 while device 104 is offline, for example, inserts, updates, deletes, and other modifications. Other operations that user 102 may perform include deep inserts, media stream updates, binds, header adjustments, and other advanced operations. Client application 120 may transmit the request queue 114 to cloud platform 130 via network 160. In an embodiment, client application 120 may transform or modify request queue 114 to optimize the performance of the transmission. Client application 120 may transmit the requests using a binary protocol, e.g., MobiLink, or in any suitable format using any appropriate protocol, for instance, as OData, JSON, XML, etc. In an embodiment, cloud platform 130 may store the received requests in an appropriate data structure in memory. In an alternate embodiment, cloud platform 130 may receive the requests one-by-one from client application 120. In an embodiment, cloud platform 130 may send a a reception confirmation to client application 120.

In 204, cloud platform 130 may determine if the requests in request queue 114 were applied. If cloud platform 130 processed the requests, i.e., the changes were applied to data producer 150 or an appropriate error added to error archive 116, method 200 proceeds to 212. If retrieved requests remain to be applied, method 200 proceeds to 206.

In 206, cloud platform 130 may apply the next request in request queue 114 to data producer 150. Cloud platform 130 may select the request to next apply from the request queue received in 202 in an appropriate order, e.g., the order the requests were performed. This request may be referred to below as the current request. In an alternate embodiment, cloud platform 130 receives the requests one-by-one and applies the current request sequentially. In an embodiment, cloud platform 130 harnesses offline services 132 and/or OData services 134 to apply the current request to data producer 150. In an embodiment, cloud platform 130 formulates an appropriate command in a structured query language to apply the request to data producer 150. Cloud platform 130 may receive an appropriate error message or confirmation of success after applying the current request.

In 208, cloud platform 130 may determine if an error occurred while processing the current request. If no error occurred, i.e., cloud platform 130 receives a confirmation of success, method 200 returns to 204. If an error occurred, method 200 proceeds to 210.

In 210, cloud platform 130 may add the error received to error archive 116. Cloud platform 130 may include in the error archive any supporting details, e.g., the entities and operations involved in the modification, a description of the error, a timestamp, a user identifier, and other appropriate information. Following 210, method 200 returns to 204.

In 212, cloud platform 130 may finish adding errors to error archive 116 and passing updates to request queue 114. A merely exemplary illustration of a request archive at this point may be:

| Request ID | Request | Mergeable Operation | Body | State |
|---|---|---|---|---|
| 1 | Create Entity(X) | Yes | {"1D": 101, "SomeProperty": "Bad Value" } | FAILED |

Figure 3:
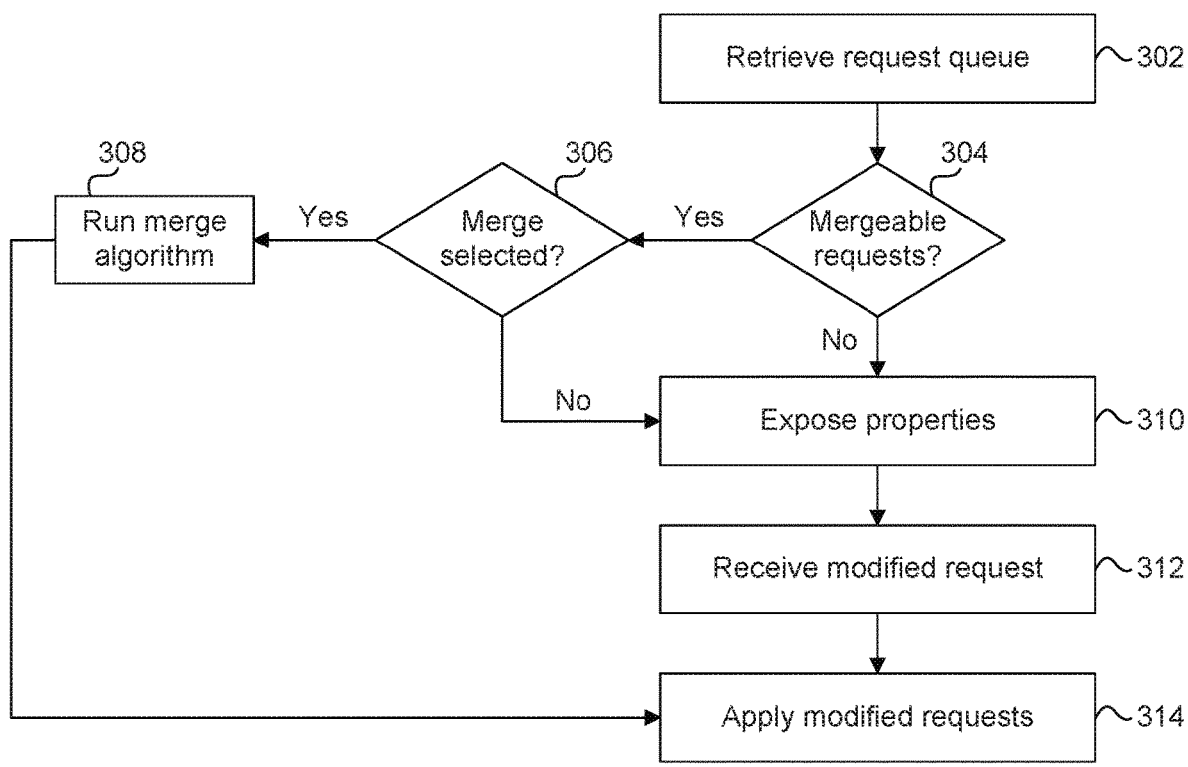
FIG. 3 is a flowchart illustrating a method of fixing non-mergeable operations in a request queue, according to some embodiments.

FIG. 3 illustrates a method 300 of fixing non-mergeable operations in a request queue, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art(s).

In 302, offline components 110 may retrieve request queue 114. Offline components 110 may retrieve queue upon request from client application 120 that includes a payload specifying properties of the customer, i.e. data specific to client application 120.

In 304, offline components 110 may determine if requests in request queue 114 are mergeable. If the requests are mergeable, then method 300 proceeds to 306. If the requests are not mergeable, then method 300 may proceed to 310.

In 306, offline components 110 may determine if a merge algorithm is to run against the requests. Although the requests in request queue 114 may be mergeable operations, client application 120 may select not to run the merge algorithm and to instead allow direct modification of requests in request queue 114. In other words, a merge-based approach may have a restriction about when it may be used to fix errors (only when the request is mergeable), however, directly fixing requests may not face such a restriction. If the merge approach is selected, then method 300 proceeds to 308. If the merge request is not selected, then method 300 may proceed to 310.

In 308, offline components 110 may run a merge algorithm. When running the merge algorithm, offline components 110 may programmatically correct failed requests in request queue 114 based on the errors in error archive 116. In the above example, offline components 110 may run the merge algorithm against the first entry in the error archive. When running the merge algorithm, offline components 110 may consider subsequent updates and changes from client application 120 to automatically determine a solution that will bring offline store 112 into synchronization with data producer 150. By way of non-limiting example, request queue 114 may resemble the following after synchronization:

| Request ID | Request | Body | State |
|---|---|---|---|
| 1 | Create Entity(X) | {"ID":101, "SomeProperty": "BadValue"} | FAILED |
| 2 | Update Entity(X) | {"SomeProperty": "Correct} | Not sent |

The merge algorithm could run against this example request queue and modify the request queue to read:

| Request ID | Request | Body | State |
|---|---|---|---|
| 1 | Create Entity(X) | "ID":101, "SomeProperty": "Correct:Value"} | Not sent |

The modified requests in this exemplary request queue may subsequently execute or run to re-synchronize offline store 112 with data producer 150, as described further below with reference to 314.

In 310, offline components 110 may expose properties to allow client application 120 to access error archive 116 and to access and modify request queue 114. For example, offline components 110 may expose navigation properties, e.g., links to an entity which is a direct representation of the request in the request queue as a typed entity based on the failed operation. Such a navigation property may allow client application 120 to, for example, request to retrieve the entities and operations run while device 104 was offline as well as the error that occurred, allowing client application 120 to facilitate an appropriate solution on the client end. Offline components 110 may expose complex properties to enable client application 120 to easily fix requests in request queue 114 and to gather additional information to create related requests. Such complex properties may include information about the source entity and the relationship to the source entity.

In 312, offline components 110 may receive a modified request from client application 120. The modified request may be formulated by client application 120 using the navigation properties and complex properties exposed in 310. Offline components 110 may allow the update to request queue 114 directly, and client application 120 may present an interface to user 102 that looks identical to the interface used to update the entity under normal user cases. So while user 102 is fixing the request, user 102 may believe that they are updating the entity. For example, an example request queue may resemble the following:

| Request ID | Request | Mergeable Operation | Body | State |
|---|---|---|---|---|
| 1 | Create Entity(X) | Yes | {"ID": 101, "SomeProperty": "Bad Value" } | FAILED |
| 2 | Update Entity(X) | No | {"SomeProperty": "Updated Value" } | FAILED (because 1 failed) |

In this example, rather than apply a subsequent update operation at the end of the request queue, client application 120 may directly update the request queue. In an embodiment, client application 120 may perform a patch operation to correct the values, resulting in:

| Request ID | Request | Mergeable Operation | Body | State |
|---|---|---|---|---|
| 1 | Create Entity(X) | Yes | {"1D": 101, "SomeProperty": "CorrectValue" } | Not sent |
| 2 | Update Entity(X) | No | {"SomeProperty": "Updated Value" } | Not sent |

In 314, offline components 110 may apply the modified request to cloud platform 130/data producer 150. By applying the modified request queue, offline components 110 may synchronize the data in offline store 112 with cloud platform 130/data producer 150. To user 102, the experience of updating the failed request may be seamless, i.e., appear identical to the customary user experience because client application 120 may access the exposed navigation and complex properties to fashion an appropriate update screen that directly modifies request queue 114 using the same type system.

In a simple non-limiting example of the foregoing steps, an exemplary client application 120 may be a sales application. This exemplary sales application may store two types of entities: Customers and Orders. In such an example, the request queue may include two requests, for example:

| Request ID | Request | Mergeable Operation | Body | State |
|---|---|---|---|---|
| 1 | Create Customer(X) | No | {"ID": 101, "CustomerName" : "New Customer" } | FAILED |
| 2 | Update Order(X) | No | {"Quantity": "5" } | FAILED |

As described above, offline components 110 may allow these requests to be fixed directly in the request queue. For example, the "CustomerName" property of the "Create Customer(X)" request may be updated or the "Quantity" property of the "Update Order(X)" request may be updated by a client application prior to reprocessing the request queue. Moreover, by harnessing a shared type system, these requests may be fixed directly in a manner that allows the client application to make the Customer request appear and behave as a Customer while making the Order request appear and behave as an Order. Thus, to an end-user, it is as though they are interacting with Customers and Orders with the client application, providing a seamless and familiar user experience.

Figure 4:
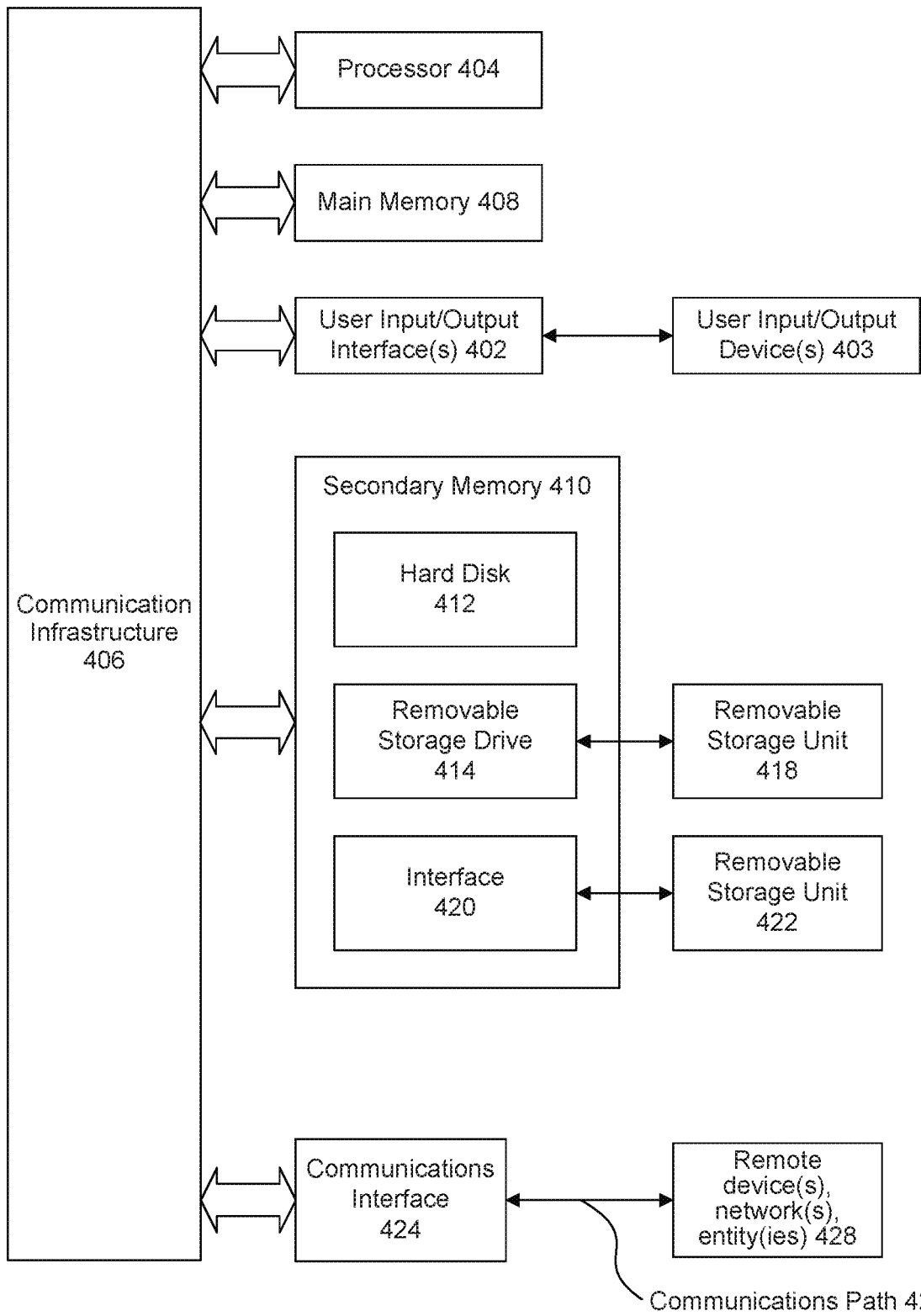
FIG. 4 is an example computer system useful for implementing various embodiments.

FIG. 4 is an example computer system useful for implementing various embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include user input/output device(s) 402, such as monitors, keyboards, pointing devices, etc., which may communicate with communication infrastructure or bus 406 through user input/output device(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   storing, by a client application, a request queue in an offline store,
      wherein the request queue stores one or more modifications,
      wherein a modification in the one or more modifications comprises an operation performed on an entity in the offline store by the client application when a device was offline, and
      wherein the modification and a request in the request queue share a type system;
   sending, by the client application, the request queue to a cloud platform;
   receiving, by the client application, an error from the cloud platform, wherein an error indicates that the application of a request in the request queue failed;
   storing, by the client application, the error in an error archive;
   providing, by the client application, access to the error archive and the request queue to a user;
   receiving, by the client application, a modified request;
   storing, by the client application, the modified request in a modified request queue; and
   sending, by the client application, the modified request queue to the cloud platform,
      wherein at least one of the storing, sending, receiving, and providing are performed by one or more computers.

2. The method of claim 1, the providing access further comprising:
   including, by the client application, a set of navigation properties in the request queue, wherein a user can navigate to a request in the request error via the set of navigation properties.

3. The method of claim 1, the providing access further comprising:
   including, by the client application, a link to the entity in the error archive.

4. The method of claim 1, wherein the operation is one of an insert, update, or delete performed on the entity in the offline store.

5. The method of claim 1, wherein the operation is a deep insert.

6. The method of claim 1, further comprising:
   determining, by the client application, that a first request in the request queue comprises a first mergeable operation;
   determining, by the client application, that a second request in the request queue comprises a second mergeable operation;
   merging, by the client application, the first request with the second request to create a merged request; and storing, by the client application, the merged request in the request queue.

7. The method of claim 1, further comprising:
deploying, by the client application, a software development kit to the device comprising a set of tools that allow the device to access the request queue and the error archive.

8. The method of claim 1, wherein the client application uses an open data access protocol to send the set of modifications to the cloud platform via a hypertext transfer protocol request.

9. A system, comprising:
a memory; and
at least one processor coupled to the memory, the at least one processor configured to:
storing a request queue in an offline store accessible by a client application,
wherein the request queue stores one or more modifications,
wherein a modification in the one or more modifications comprises an operation performed on an entity in the offline store by the client application when a device was offline, and
wherein the modification and a request in the request queue share a type system;
send the request queue to a cloud platform;
receive an error from the cloud platform, wherein an error indicates that the application of a request in the request queue failed;
store the error in an error archive;
provide access to the error archive and the request queue to a user;
receive a modified request;
store the modified request in a modified request queue; and
send the modified request queue to the cloud platform.

10. The system of claim 9, wherein to provide access, the at least one processor is further configured to:
include a set of navigation properties in the request queue, wherein a user can navigate to a request in the request error via the set of navigation properties.

11. The system of claim 9, wherein to provide access, the at least one processor is further configured to:
include a link to the entity in the error archive.

12. The system of claim 9, wherein the operation is one of an insert, update, or delete performed on the entity in the offline store.

13. The system of claim 9, wherein the operation is a deep insert.

14. The system of claim 9, the at least one processor further configured to:
determine that a first request in the request queue comprises a first mergeable operation;
determine that a second request in the request queue comprises a second mergeable operation;
merge the first request with the second request to create a merged request; and
store the merged request in the request queue.

15. The system of claim 9, the at least one processor further configured to:
deploy a software development kit to the device comprising a set of tools that allow the device to access the request queue and the error archive.

16. The system of claim 9, wherein the client application uses an open data access protocol to send the set of modifications to the cloud platform via a hypertext transfer protocol request.

17. A non-transitory computer-readable device having instructions stored thereon that, when executed by at least one computing device, cause the at least one computing device to perform operations comprising:
storing a request queue in an offline store accessible by a client application,
wherein the request queue stores one or more modifications, and
wherein a modification in the one or more modifications comprises an operation performed on an entity in the offline store by the client application when a device was offline, and
wherein the modification and a request in the request queue share a type system;
sending the request queue to a cloud platform;
receiving an error from the cloud platform, wherein an error indicates that the application of a request in the request queue failed;
storing the error in an error archive;
providing access to the error archive and the request queue to a user;
receiving a modified request;
storing the modified request in a modified request queue; and
sending the modified request queue to the cloud platform.

18. The non-transitory computer-readable device of claim 17, the providing access further comprising:
including a set of navigation properties in the request queue, wherein a user can navigate to a request in the request error via the set of navigation properties.

19. The non-transitory computer-readable device of claim 17, the providing access further comprising:
including a link to the entity in the error archive.

20. The non-transitory computer-readable device of claim 17, the operations further comprising:
determining that a first request in the request queue comprises a first mergeable operation;
determining that a second request in the request queue comprises a second mergeable operation;
merging the first request with the second request to create a merged request; and
storing the merged request in the request queue.

* * * * *